(12) United States Patent
Moseke

(10) Patent No.: US 10,644,422 B2
(45) Date of Patent: May 5, 2020

(54) PLUG CONNECTOR PART HAVING A COOLED CONTACT ELEMENT

(71) Applicant: Phoenix Contact E-Mobility GmbH, Schieder-Schwalenberg (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/082,291

(22) PCT Filed: Mar. 15, 2017

(86) PCT No.: PCT/EP2017/056063
§ 371 (c)(1),
(2) Date: Sep. 5, 2018

(87) PCT Pub. No.: WO2017/162494
PCT Pub. Date: Sep. 28, 2017

(65) Prior Publication Data
US 2019/0036254 A1    Jan. 31, 2019

(30) Foreign Application Priority Data

Mar. 22, 2016  (DE) .......................... 10 2016 105 347

(51) Int. Cl.
*H01R 4/60* (2006.01)
*H01R 13/00* (2006.01)
(Continued)

(52) U.S. Cl.
CPC ............ *H01R 13/005* (2013.01); *B60L 53/16* (2019.02); *B60L 53/302* (2019.02);
(Continued)

(58) Field of Classification Search
CPC ................ H01R 13/005; H01R 13/533; H01R 2201/26; B60L 53/302; B60L 11/1818;
(Continued)

(56) References Cited

U.S. PATENT DOCUMENTS 5,781,692 A * 7/1998 Wagner ................ H05B 3/0038
118/724
6,471,530 B1 * 10/2002 Gimbatti .............. H01R 13/005
439/196
(Continued)

FOREIGN PATENT DOCUMENTS

DE        19921310 A1    11/2000
DE    102010007975 B4    10/2012
(Continued)

*Primary Examiner* — Abdullah A Riyami
*Assistant Examiner* — Nelson R. Burgos-Guntin
(74) *Attorney, Agent, or Firm* — Leydig, Voit & Mayer, Ltd.

(57) ABSTRACT

A plug-in connector part for connection to a mating plug-in connector part includes: a contact element for electrically contacting an associated mating contact element of the mating plug-in connector part. The contact element includes a contact portion for contacting the mating contact element of the mating plug-in connector part and a shank portion for connecting a load line for transmitting an electrical current. The contact element includes a channel, which extends in the contact element and to which at least one coolant line is fluidically connectable, for guiding a coolant through the contact element.

11 Claims, 3 Drawing Sheets

(51) Int. Cl.
   *H01R 13/533* (2006.01)
   *B60L 53/16* (2019.01)
   *B60L 53/302* (2019.01)
   *H01R 24/38* (2011.01)

(52) U.S. Cl.
   CPC ........... *H01R 13/533* (2013.01); *H01R 24/38* (2013.01); *H01R 2201/26* (2013.01); *Y02T 10/7005* (2013.01); *Y02T 10/7072* (2013.01); *Y02T 90/14* (2013.01)

(58) Field of Classification Search
   CPC ...... B60L 53/18; B60L 53/16; B60L 2230/12; Y02T 10/7005; Y02T 10/7072; Y02T 90/14
   USPC .................................. 439/485, 34, 196, 660
   See application file for complete search history.

(56) References Cited

U.S. PATENT DOCUMENTS

| | | | |
|---|---|---|---|
| 8,835,782 | B2 | 9/2014 | Fischer-Carne et al. |
| 2003/0176092 | A1* | 9/2003 | Itoh ................... H01R 13/6315 439/174 |
| 2006/0281352 | A1* | 12/2006 | Kabasawa ........... H01R 13/631 439/247 |
| 2008/0214022 | A1* | 9/2008 | Kowalick ............ H01R 13/443 439/34 |
| 2009/0239408 | A1* | 9/2009 | Sacher ..................... H01R 4/28 439/376 |
| 2009/0273310 | A1* | 11/2009 | Flack .................... H01R 24/38 320/107 |
| 2010/0255686 | A1* | 10/2010 | Doo .................. H01R 13/2421 439/34 |
| 2014/0217840 | A1* | 8/2014 | Buttner ..................... H02K 1/20 310/52 |
| 2016/0043485 | A1* | 2/2016 | Stoermer ........... H01R 12/7076 439/78 |
| 2016/0190718 | A1* | 6/2016 | VanZuilen ........... H01R 12/515 310/71 |
| 2018/0264962 | A1* | 9/2018 | Wischnack ......... B60L 11/1825 |
| 2019/0074620 | A1* | 3/2019 | Moseke ............... H01R 13/005 |

FOREIGN PATENT DOCUMENTS

| | | |
|---|---|---|
| EP | 2104183 A1 | 9/2009 |
| JP | 2007330507 A | 12/2007 |
| WO | WO 2009134379 A1 | 11/2009 |
| WO | WO 2012051510 A2 | 4/2012 |
| WO | WO 2015119791 A1 | 8/2015 |

* cited by examiner

PLUG CONNECTOR PART HAVING A COOLED CONTACT ELEMENT

CROSS-REFERENCE TO PRIOR APPLICATIONS

This application is a U.S. National Phase application under 35 U.S.C. § 371 of International Application No. PCT/EP2017/056063, filed on Mar. 15, 2017, and claims benefit to German Patent Application No. DE 10 2016 105 347.3, filed on Mar. 22, 2016. The International Application was published in German on Sep. 28, 2017 as WO 2017/162494 under PCT Article 21(2).

FIELD

The invention relates to a plug-in connector part for connection to a mating plug-in connector part.

BACKGROUND

A plug-in connector part of this kind comprises a contact element for electrically contacting an associated mating contact element of the mating plug-in connector part. The contact element comprises a contact portion for contacting the mating contact element of the mating plug-in connector part, and a shank portion for connecting a load line for transmitting an electrical current.

A plug-in connector part of this kind can be used in particular as a charging plug or as a charging socket for charging an electrically powered vehicle (also referred to as an electric vehicle). In this case, for example a cable is connected to a charging station and also carries the plug-in connector part in the form of a charging plug that can be plugged into an associated mating plug-in connector part, in the form of a charging socket, on a vehicle, in order to thus establish an electrical connection between the charging station and the vehicle.

In principle, charging currents can be transmitted as direct currents or alternating currents, charging currents in the form of direct current in particular having a high amperage, for example greater than 200 A or even greater than 300 A or even 350 A, it being possible for said charging currents to cause the cable, as well as a plug-in connector part connected to the cable, to heat up.

A charging cable known from DE 10 2010 007 975 B4 has a coolant line which comprises a supply line and a return line for a coolant, therefore allowing a coolant to flow in and out of the charging cable. In this case, the coolant line in DE 10 2010 007 975 B4 is used to dissipate heat produced due to energy loss from an energy store of a vehicle, but in addition also to cool the cable itself.

In a charging system for charging an electric vehicle, heat is produced not only in the cable by means of which a charging plug is connected to a charging station, for example, but also in the charging plug and in particular within the charging socket, for example in contact elements by means of which electrical contact to associated mating contact elements, for example on a charging socket on an electric vehicle, is established when the charging plug is plugged into the charging socket. Contact elements of this kind, which are made of an electrically conductive metal material, for example a copper material, are heated up when a charging current flows via the contact elements, which, in principle, are dimensioned on the basis of the charging current to be transmitted and such that the contact elements have a sufficient current-carrying capacity and the heating of the contact elements is limited. In this case, a contact element is dimensioned so as to be larger the higher the charging current to be transmitted is.

However, limits are set on scaling the size of the contact element against increasing charging current on account of the associated installation space requirements, the weight and the costs. There is therefore a requirement to transmit a high charging current by means of a relatively small contact element.

In a charging system known from WO 2015/119791 A1 for charging an electric vehicle, coolant lines are guided inside a charging cable, by means of which lines heat can also be dissipated from the region of a plug-in connector part connected to the charging cable.

In a contact element known from U.S. Pat. No. 8,835,782, cooling ribs are arranged on a shank of the contact element.

SUMMARY

In an embodiment, the present invention provides a plug-in connector part for connection to a mating plug-in connector part, comprising: a contact element configured to electrically contact an associated mating contact element of the mating plug-in connector part, the contact element comprising a contact portion configured to contact the mating contact element of the mating plug-in connector part and a shank portion configured to connect a load line for transmitting an electrical current, wherein the contact element includes a channel, which extends in the contact element and to which at least one coolant line is fluidically connectable, configured to guide a coolant through the contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
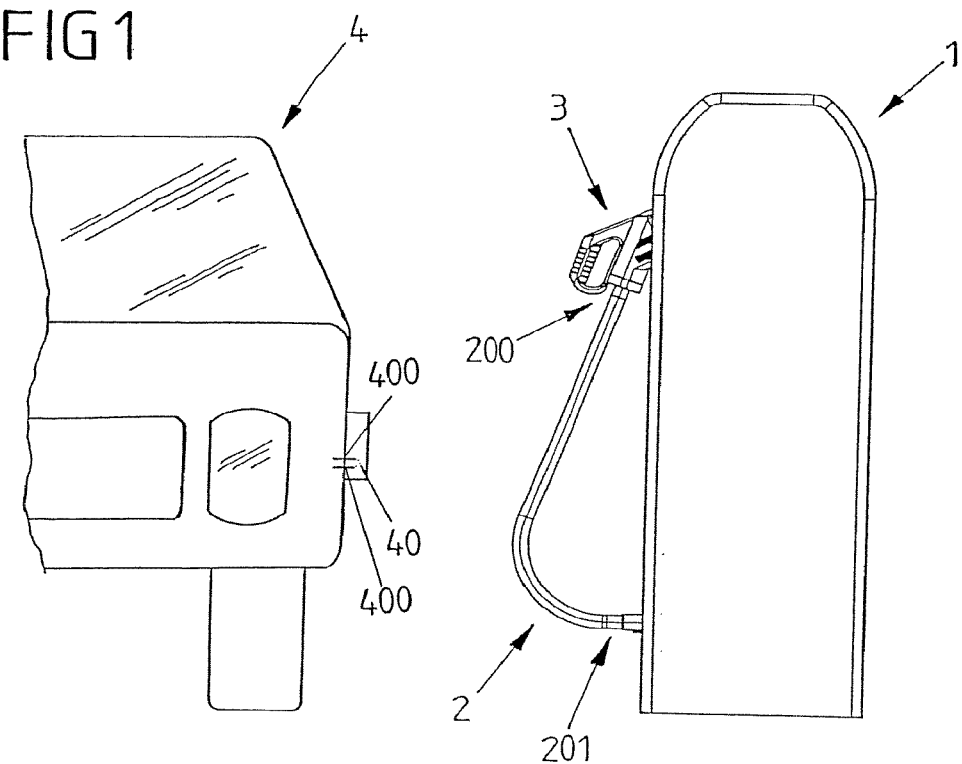
FIG. 1 shows a charging system for charging an electric vehicle.

In an embodiment, the present invention provides a plug-in connector part having a contact element which can have a high current-carrying capacity, for example for use in a charging system for charging an electric vehicle.

According thereto, the plug-in connector part comprises a channel, which extends in the contact element and to which at least one coolant line can be fluidically connected, for guiding a coolant through the contact element.

Providing the channel in the contact element makes it possible for a coolant to be guided directly through the contact element. In this way, cooling is provided directly at the location where heat results during operation of the plug-in connector part when an electrical current is conducted via the contact element.

If the plug-in connector part is designed as a charging plug for example, and if a load line for transmitting a charging current, for example a direct current, is connected to the contact element, heating results at the contact element during a charging process. Since a coolant can be conducted through the channel of the contact element, said heat can be absorbed at the contact element and dissipated from the contact element, making it possible to dimension the contact element so as to be comparatively small while having a high current-carrying capacity.

The contact element is preferably produced from metal and comprises an integral body that forms the contact portion, for example in the form of a contact socket or a contact piece, and the shank portion. The channel is formed in said integral body, for example by means of a hole being made in the body. The channel thus extends within the body, such that a coolant can be conducted through the body and it is thus possible to counteract heating of the body.

The contact element may have a substantially cylindrical basic shape for example. Accordingly, the shank portion, by means of which a load line is to be connected to the contact element, may also be cylindrical, such that a load line can for example be plugged into the shank portion or pushed onto the shank portion in order to come into electrical contact with the contact element.

In this case, the channel may extend coaxially to the shank portion for example, such that the channel extends axially in the contact element and a coolant can thus flow longitudinally through the contact element.

The channel provides a closed guide for the coolant, such that the coolant can be introduced into the channel via a coolant line that is fluidically connected to the channel and can be discharged from the channel via another coolant line that is fluidically connected to the channel. A coolant flow through the channel is thus provided, by means of which heat can be absorbed at the contact element and discharged in a guided manner.

The channel may for example comprise a first end to which a first coolant line can be fluidically connected, and a second end to which a second coolant line can be fluidically connected. The channel is designed to guide a coolant between the first end and the second end, such that the channel provides a flow path within the contact element and a coolant can thus flow through the contact element.

In order to connect the first coolant line, the contact element may comprise an attachment connector that extends radially inside the shank portion. The attachment connector may be coaxial to the shank portion for example, the shank portion forming a hollow cylinder for example and it being possible for the coolant line to be plugged into a gap between the radially outer shank portion and the radially inner attachment connector in order to thus establish a fluidic connection between the coolant line and the channel that extends inside the attachment connector.

A coolant, for example, can be supplied via the first coolant line that is connected to the attachment connector. In this case, said first coolant line may extend within an electrically conductive line casing of the load line for example, such that the coolant line is guided inside the load line and can thus also absorb heat at the load line. In order to connect the load line, comprising the coolant line guided therein, to the contact element, the line casing of the load line is pushed, for example, onto the shank portion of the contact element and is crimped to the shank portion, for example by means of a sleeve element. In contrast, the coolant line is attached to the attachment connector and is fluidically connected thereby to the channel that extends in the contact element.

In order to provide a coolant circuit, a connecting element is preferably attached to the contact element, which connecting element is fluidically connected to the channel and to which element the second coolant line can be connected. The second coolant line may be used for discharging the coolant for example, such that a coolant circuit is provided by means of supplying the coolant via the first coolant line and discharging the coolant via the second coolant line.

The connecting element may be manufactured from plastics material or metal. The connecting element may be in the shape of an L-piece for example, comprising a flow channel which is formed therein and is fluidically connected to the channel of the contact element, and thus allows for the coolant to be discharged from the channel.

In one embodiment, the plug-in connector part is connected to a cable in which a load line, connected to the contact element, and at least one coolant line are guided. If the plug-in connector part is formed as a charging plug for example, the cable may for example establish a connection to a charging station, such that the plug-in connector part can be plugged into an associated mating plug-in connector part, for example in the form of a charging socket, on an electric vehicle, in order to thus establish an electrical connection between the charging station and the electric vehicle in order to charge batteries of the electric vehicle.

In one embodiment, the load line may comprise an electrically conductive line casing, inside which a coolant line is guided. The line casing may be implemented by means of a copper strand braid (or copper strands) and is used for transmitting the load current. Since a coolant line extends coaxially inside the line casing, coolant flowing in the coolant line can absorb heat directly at the load line in order to at least reduce heating along the load line. Since a coolant flows through the coolant line, laid inside the load line, and also through a contact element connected to the load line, cooling can be provided both at the load line and at the contact element connected to the load line.

The line casing may be pushed onto the shank portion of the contact element for example, such that the line casing peripherally surrounds the shank portion at least in part. The shank portion thus electrically contacts the line casing, it being possible for the connection to be ensured for example by means of a sleeve element that is crimped to the shank portion.

Whereas the line casing of the load line is pushed onto the shank portion, the coolant line that is guided in the line casing of the load line is preferably attached to a radially inner attachment connector that is coaxial to the shank portion, and is thus connected to the contact element. The attachment connector fluidically connects the coolant line to the channel that extends in the contact element, such that a coolant can flow into the channel via the coolant line.

In order to provide a coolant circuit, a further coolant line is preferably guided in the channel, which coolant line extends outside the load line and is thus laid in the cable separately from the load line. Said further coolant line is also connected to the contact element and is fluidically connected to the channel, such that for example a coolant can be discharged from the channel of the contact element via said further coolant line.

A coolant used for cooling may be gaseous or liquid for example. For example, an airflow may be provided for cooling, which airflow is introduced into the channel and discharged from the channel in order to thus provided a cooling circuit.

A plug-in connector part of the type described herein can be used for example as a charging plug or charging socket within the context of a charging system for charging an electric vehicle. A plug-in connector part of this kind may for example be arranged on a charging cable and be connected to a charging station by means of the charging cable. A charging plug of this kind may for example be plugged into a charging socket on an electric vehicle in order to transmit charging currents between the charging station and the electric vehicle.

FIG. 1 shows a charging station 1 which is used for charging an electrically operated vehicle 4 (also referred to as an electric vehicle). The charging station 1 is designed to provide a charging current in the form of an alternating current or a direct current and has a cable 2, one end 201 of which is connected to the charging station 1 and another end 200 of which is connected to a plug-in connector part 3 in the form of a charging plug.

Figure 2:
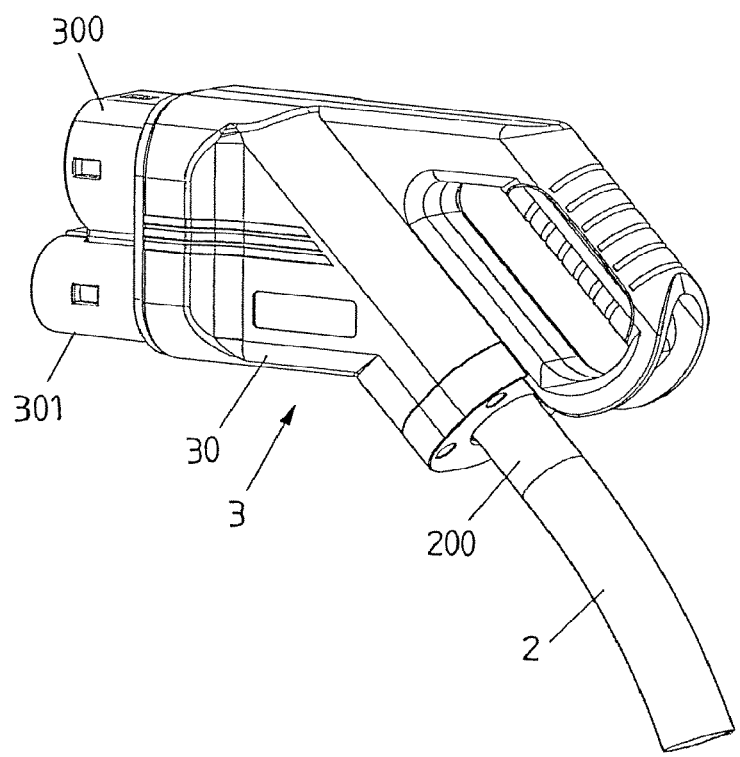
FIG. 2 shows a plug-in connector part in the form of a charging plug.

As can be seen in the enlarged view of FIG. 2, the plug-in connector part 3 has plug-in portions 300, 301 on a housing 30, by means of which portions the plug-in connector part 3 can be brought into engagement in a plug-in manner with an associated mating plug-in connector part 40 in the form of a charging socket on the vehicle 4. In this way, the charging station 1 can be electrically connected to the vehicle 4 in order to transmit charging currents from the charging station 1 into the vehicle 4.

In order to allow rapid charging of the electric vehicle 4, e.g. in the context of a fast charging process, the transmitted charging currents have a high amperage, e.g. greater than 200 A, optionally even of the magnitude of 350 A or more. On account of such high charging currents, thermal losses occur on the cable 2 and also on the plug-in connector part 3 and the charging socket 40, which can lead to the cable 2, the plug-in connector part 3 and the charging socket 40 being heated.

The plug-in connector part 3 comprises a plurality of contact elements on the plug-in portions 300, 301 thereof. For example, two contact elements for transmitting a charging current in the form of a direct current may be arranged on the plug-in portion 301, while for example contact elements for providing an earthing PE contact and signal contacts for transmitting control signals may be arranged on the plug-in portion 300.

Figure 3:
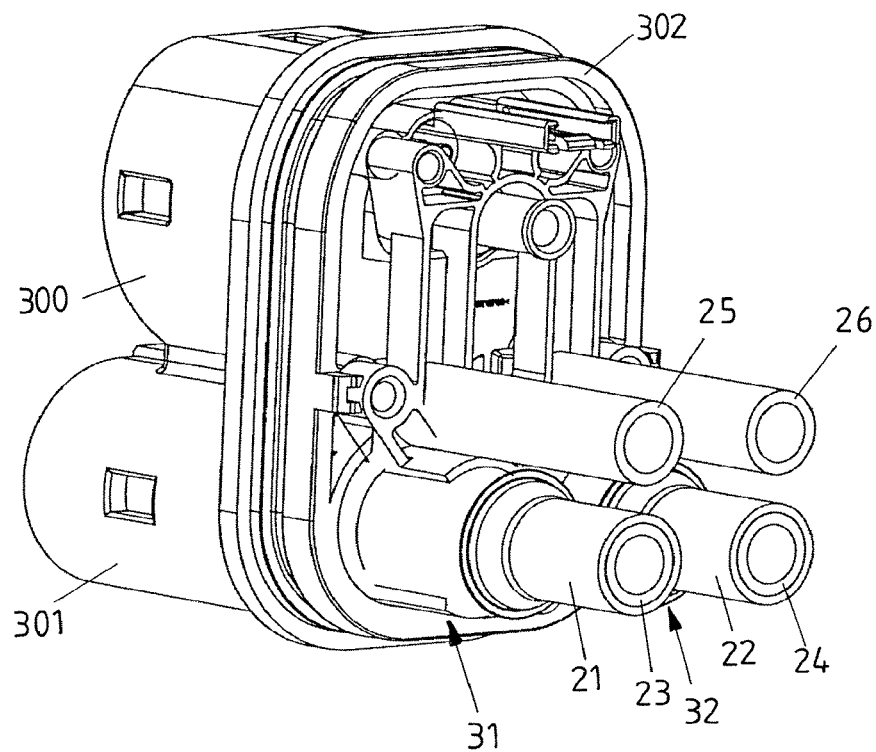
FIG. 3 shows a sub-assembly of the plug-in connector part comprising two contact elements.
Figure 4:
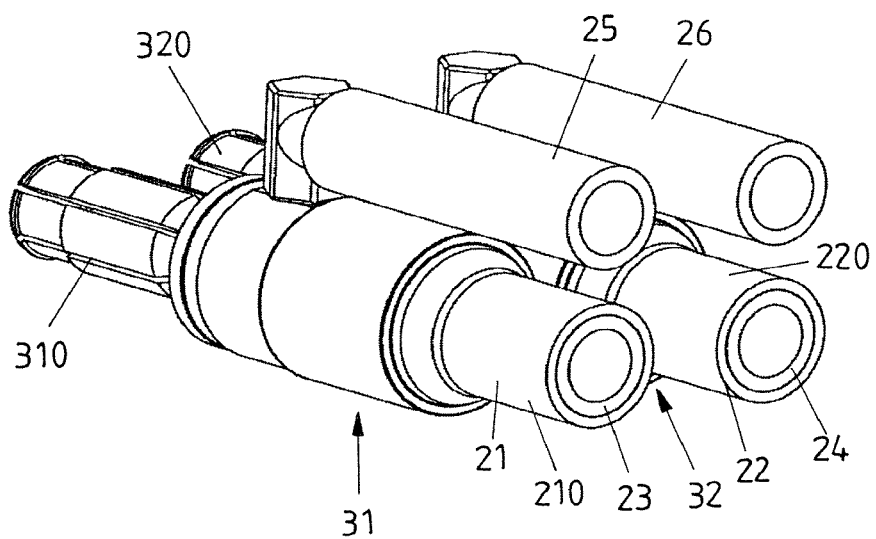
FIG. 4 is a separate view of the contact elements.

FIG. 3 shows an embodiment of a sub-assembly of the plug-in connector part 3, comprising a housing part 302 on which the plug-in portions 300, 301 are formed. Inter alia two contact elements 31, 32 are arranged on the housing part 302, contact portions 310, 320 (see FIG. 4) of which contact elements protrude into the lower plug-in portion 301 and form the plug-in face which can electrically contact mating contact elements 400 of the mating plug-in connector part 40 (see FIG. 1) when the plug-in connector part 3 is plugged into the associated mating plug-in connector part 40. The contact portions 310, 320 of the contact elements 31, 32, which portions are formed as contact sockets, thus engage in the mating contact elements 400, formed as contact pins, when the plug-in connector part 3 is plugged into the mating plug-in connector part 40, such that electrical contact is established between the contact elements 31, 32 and the mating contact elements 400.

In the embodiment of the contact elements 31, 32 shown in FIG. 4 to 7, load lines 21, 22 guided in the cable 2 are connected to the contact elements 31, 32. Said load lines 21, 22 are used for transmitting an electrical (direct) current between the charging station 1 and the electric vehicle 4 and each comprise an electrically conductive line casing 210, 220, for example in the form of a copper strand braid, which is encased in electrical insulation, is attached to a shank portion 312 of the associated contact element 31, 32, and is thus electrically contacted by the contact element 31, 32.

In order to connect the line casing 210, 220 to the shank portion 312 in a mechanically rigid manner, a cylindrical sleeve element 314 made of metal is attached to the shank portion 312 such that the line casing 210, 220 pushed onto the shank portion 312 is crimped to the shank portion 312 by means of the sleeve element 314. In this case, after being attached to the shank portion 312, the sleeve element 114 may be crimped to the shank portion 312 using a suitable crimping tool and with interposition of the line casing 210, 220.

A coolant line 23, 24 is guided inside the line casing 210, 220, which line is thus received and guided coaxially inside the load line 21, 22. In this manner, a coolant flowing through the coolant line 23, 24 can absorb heat directly at the load line 21, 22 and dissipate said heat from the load line 21, 22 in order to prevent (excessive) heating of the load line 21, 42 along the length thereof that extends in the cable 2.

Figure 5:
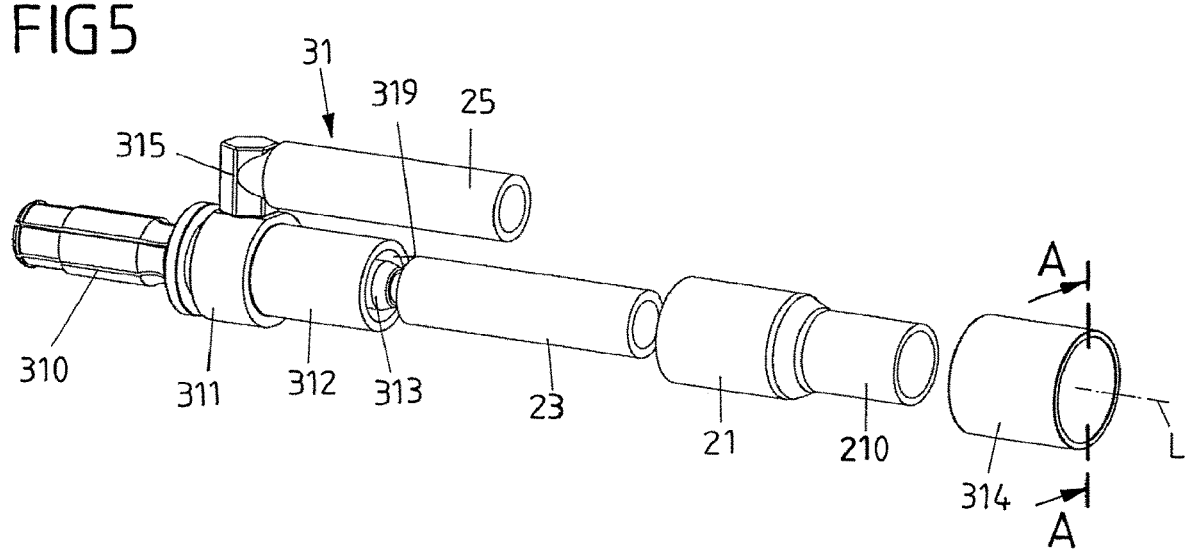
FIG. 5 is a separate exploded view of a contact element.
Figure 6:
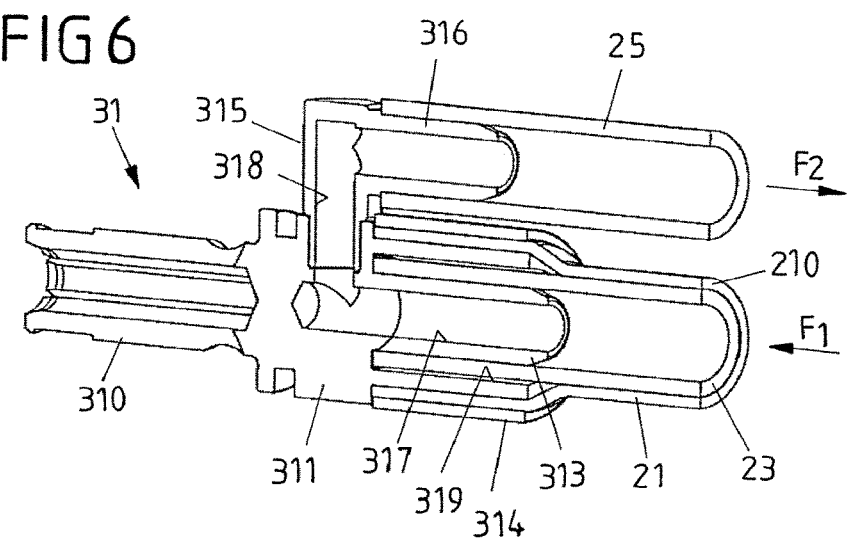
FIG. 6 is a sectional view along the line A-A according to FIG. 5.
Figure 7:
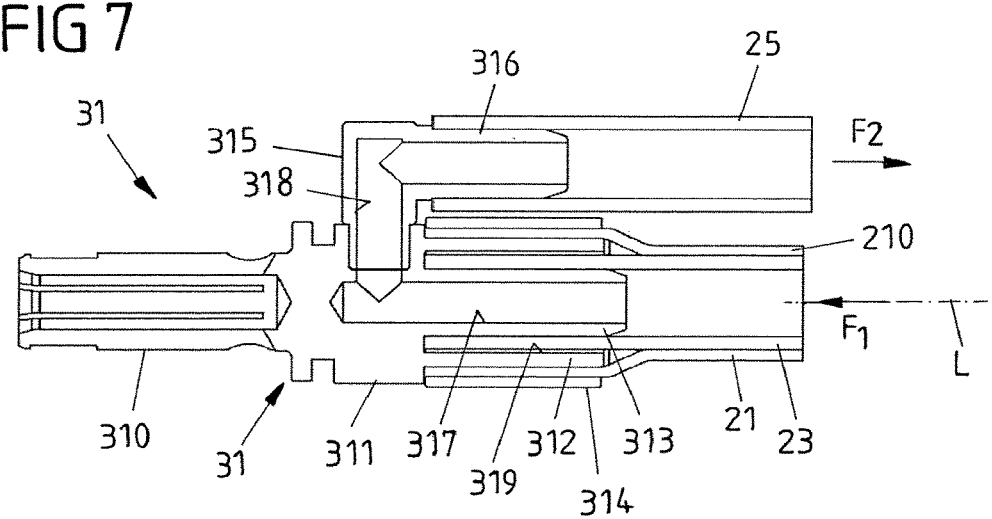
FIG. 7 is another sectional view along the line A-A according to FIG. 5.

As shown in FIG. 5 to 7 for the contact element 31, the coolant line 23, 24 of each contact element 31, 32 is attached to an attachment connector 313 that is arranged radially inside the cylindrical shank portion 312 by means of the coolant line 23, 24 being plugged into a peripheral gap 319 formed between the attachment connector 313 and the shank portion 312. The coolant line 23, 24 is thus fluidically connected to a channel 317 of the contact element 31, 32 extending inside the attachment connector 313, such that a coolant can flow between the coolant line 23, 24 and the channel 317.

The contact elements 31, 32 have a substantially cylindrical basic shape having a longitudinal axis L that forms the cylinder axis. The contact elements 31, 32 can be brought into engagement in a plug-in manner with the associated mating contact elements 400 along said longitudinal axis L, and the load lines 21, 22 adjoin the contact elements 31, 32 along said longitudinal axis L.

The contact element 31, 32 is formed integrally as a metal body and comprises a cylinder portion 311 which adjoins the contact portion 310, 320 and from which the shank portion 312 protrudes axially. The channel 317 is formed in the contact element 31, 32, for example as a hole, coaxially to the cylindrical shank portion 312 and to the cylinder portion 311, and extends inside the contact element 31, 32. Heat can thus be absorbed at the contact element 31, 32 and dissipated from the contact element 31, 32 by means of a coolant flowing through the channel 317.

A connecting element 315 in the form of an L-piece is attached to the cylinder portion 311, which element comprises a flow channel 318 that is fluidically connected to the channel 317 formed in the contact element 31, 32. A further coolant line 25, 26 is attached to an attachment connector 316 formed on the connecting element 315, such that said further coolant line 25, 26 is also fluidically connected to the channel 317 and a coolant circuit can thus be provided.

For example, as shown in FIGS. 6 and 7, a coolant can be supplied via the coolant line 23, 24 that is laid coaxially inside the load line 21, 22, and can thus flow into the channel 317 in a flow direction F1. The coolant flows out of the channel 317 via the connecting element 315 and is discharged via the coolant line 25, 26 in a flow direction F2, so as to result in a coolant flow through the contact element 31, 32.

Said coolant flow absorbs heat both at the load line 21, 22 and at the contact element 31, 32 connected to the load line 21, 22. For example a gaseous fluid, for example air, can be used as the coolant, it also being conceivable and possible to use an (electrically non-conductive) coolant liquid.

Whereas the coolant lines 23, 24 are laid coaxially inside the load lines 21, 22 that are electrically connected to the contact elements 31, 32, the coolant lines 25, 26 that are connected to the connecting elements 315 of the contact elements 31, 32 extend outside the load lines 21, 22. The load lines 21, 22, having the coolant lines 23, 24 guided therein, and the further coolant lines 25, 26 are laid inside the cable 2 and thus extend from the charging station 1 to the plug-in connector part 3.

The concept on which the invention is based is not limited to the embodiments described above but can in principle also be implemented by quite different embodiments.

A plug-in connector part of the type described herein can be used within the context of a charging system for charging an electric vehicle. However, it is also conceivable and possible to use a plug-in connector part of the type described herein in other applications for plug-in connection to an associated mating plug-in connector part.

Since a channel for conducting a coolant is made directly in a contact element, cooling is provided directly at the contact element. Heat can thus be effectively absorbed at the contact element and discharged from the contact element.

Since a coolant line also extends inside the load line, heat can also be effectively absorbed at the load line. Since the coolant line extends coaxially inside the load line, the coolant line rests in an extensive manner on the inside of a current-conducting line casing of the load line, such that heat can be effectively introduced into the coolant line and into a coolant guided therein.

Although cooling of contact elements used for transmitting direct current has been described above, this is not limiting. In principle, cooling of the type described herein can also be applied to contact elements that are used for transmitting an alternating current.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 charging station
2 charging cable
200, 201 end
21, 22 load line
210, 220 electrically conductive line casing
23-26 coolant line
3 charging plug
30 housing
300, 301 plug-in portion
302 housing part
31, 32 contact element (load contact)
310, 320 contact portion (socket)
311 cylinder portion
312 shank portion
313 attachment connector
314 sleeve element
315 connecting element
316 attachment connector
317 channel
318 channel
319 gap
4 vehicle
40 charging socket
400 mating contact element
F1, F2 flow direction
L longitudinal axis

The invention claimed is:

1. An assembly, comprising:
a plug-in connector part for connection to a mating plug-in connector part, the plug-in connector part comprising a contact element configured to electrically contact an associated mating contact element of the mating plug-in connector part, the contact element comprising a contact portion configured to contact the mating contact element of the mating plug-in connector part and a shank portion configured to connect a load line for transmitting an electrical current, and
a cable that is connected to the plug-in connector part and guides the load line connected to the contact element and at least one coolant line,
wherein the contact element includes a channel, which extends in the contact element and to which the at least one coolant line is fluidically connected, the channel being configured to guide a coolant through the contact element.

2. The assembly according to claim 1, wherein the contact element comprises an integral body that forms the contact portion and the shank portion and in which the channel is formed.

3. The assembly according to claim 1, wherein the shank portion is cylindrical.

4. The assembly according to claim 3, wherein the channel extends coaxially to the shank portion.

5. The assembly according to claim 1, wherein the channel comprises a first end to which a first coolant line is fluidically connectable, and a second end to which a second coolant line is fluidically connectable, the channel being configured to guide the coolant between the first end and the second end.

6. The assembly according to claim 5, wherein the contact element comprises an attachment connector that extends radially inside the shank portion and to which the first coolant line is connectable for fluidic connection to the channel.

7. The assembly according to claim 5, further comprising a connecting element that is attached to the contact element, is fluidically connected to the channel, and to which the second coolant line is connectable for fluidic connection to the channel.

8. The assembly according to claim 1, wherein the load line comprises an electrically conductive line casing, and the at least one coolant line is guided coaxially inside the line casing.

9. The assembly according to claim 8, wherein the line casing is pushed onto the shank portion of the contact element such that the line casing peripherally surrounds the shank portion at least in part.

10. The assembly according to claim 8, wherein the at least one coolant line that is guided coaxially inside the line casing is connected to the contact element such that the at least one coolant line is fluidically connected to the channel of the contact element.

11. The assembly according to claim 8, wherein a further coolant line is guided in the cable, which further coolant line extends outside the load line and is connected to the contact element such that the further coolant line is fluidically connected to the channel.

* * * * *